United States Patent [19]
Terashima

[11] Patent Number: 6,005,744
[45] Date of Patent: Dec. 21, 1999

[54] STORAGE DEVICE FOR STORING MAGAZINES OF RECORDABLE MEDIA

[75] Inventor: Toshihiko Terashima, Chino, Japan

[73] Assignee: Chinon Kabushiki Kaisha, Japan

[21] Appl. No.: 09/019,374

[22] Filed: Feb. 5, 1998

[30] Foreign Application Priority Data

Jun. 16, 1997 [JP] Japan .................................. 9-158834

[51] Int. Cl.⁶ .................................................. G11B 31/00
[52] U.S. Cl. .............................. 360/92; 369/178; 369/38
[58] Field of Search .................................. 360/92, 98.01, 360/98.04, 98.05, 98.06; 369/36, 178, 37, 38, 180

[56] References Cited

U.S. PATENT DOCUMENTS

| | | | |
|---|---|---|---|
| 4,907,889 | 3/1990 | Simone | 360/92 |
| 5,337,297 | 8/1994 | Kvifte et al. | 360/92 |
| 5,442,500 | 8/1995 | Hidano et al. | 360/92 |
| 5,644,445 | 7/1997 | Ishikawa | 360/92 |
| 5,818,802 | 10/1998 | Menke et al. | 360/36 |

*Primary Examiner*—David D. Davis
*Attorney, Agent, or Firm*—Morrison Law Firm

[57] ABSTRACT

A storage device for recordable media provides for ease of access for replacing disks, and transportability with ease of installation at any desired site. A front storage portion and a rear storage portion both of which include magazines are arranged in a body case. Each magazine is capable of containing a plurality of disks. A transfer mechanism freely transfers disks from or to magazines of the front storage portion or the rear storage portion. A vertical motion drive mechanism moves the transfer mechanism to a desired transfer position to transfer a disk to or from a magazine. The transfer mechanism can be moved to a retracted position at a sufficient distance from the magazines so that an extension mechanism can move the front and rear storage portions along the body case. After the vertical motion drive mechanism moves the transfer mechanism to the retracted position, the extension mechanism permits the front storage portion and the rear storage portion to be pulled out of the body case so that each magazine itself can be inserted, removed or exchanged.

7 Claims, 14 Drawing Sheets

FIG. II

STORAGE DEVICE FOR STORING MAGAZINES OF RECORDABLE MEDIA

BACKGROUND OF THE INVENTION

The present invention relates to a recordable media storage device having magazines, each of which is capable of storing a plurality of recordable media, wherein said device is adapted to position each recordable media at a given location inside a magazine and remove the same therefrom.

There are various devices which store numerous recordable media, magnetically or optically, containing information therein in a magazine or magazines. The devices position the recordable media at a given location or locations inside the magazines and remove the same therefrom. An example of such a device is a disk changing apparatus.

A disk changing apparatus typically stores a large number of disk-shaped recordable media such as CDs or DVDs in magazines and is provided with a drive unit for magnetically or optically recording onto and playing information stored on the disks. The disk changing apparatus is further adapted to set a disk from a magazine into the drive unit and insert a disk from the drive unit into a magazine.

A typical structure of a conventional disk changing apparatus of the above type is explained hereunder, referring to FIGS. 13 and 14.

In FIGS. 13 and 14, numeral 11 denotes a body case. A front storage portion 13 and a rear storage portion 14, each of which is adapted to store therein vertically stacked recordable media (disks 12 in this case), are respectively provided at the front and rear parts of the interior of the body case 11. A vertically movable transfer mechanism 15 is disposed between the front storage portion 13 and the rear storage portion 14. The transfer mechanism 15 is adapted to be driven by a vertical motion drive mechanism 16 so as to move to a desired transfer position, i.e. a desired height, between the front and rear storage portions 13, 14.

An access mechanism 17 for inserting and removing disks 12 is disposed above the front storage portion 13. The access mechanism 17 is attached to a support plate 18 which is mounted on a ceiling surface 11a of the body case 11. The access mechanism 17 includes an access tray 19 which can be pulled partway out of the case body 11 and thus transport disks 12 back and forth between the exterior of the apparatus and the transfer mechanism 15. A plurality of drive units 20 (for example four units) for magnetically or optically performing reading and/or writing of disks 12 are vertically stacked and disposed below the rear storage portion 14. Each drive unit 20 has a driving tray 21 to transport a disk 12 to and from the transfer mechanism 15.

The transfer mechanism 15 is supported and guided on two vertically extending rails 23 to move up and down. As shown in FIG. 14, the two rails 23 are disposed to the left side of the interior of the body case 11, with the upper and the lower ends thereof attached to a rail plate 24. The vertical motion drive mechanism 16 includes a vertically extending timing belt 25 that vertically moves the transfer mechanism 15, which is affixed to the timing belt 25.

The timing belt 25 is wrapped around an upper pulley 27 and a timing pulley 30. The upper pulley 27 is supported by a pulley shaft 26 affixed to the upper part of the rail plate 24 by crimping. The timing pulley 30 is rotated by a vertical motion drive motor 28 through a worm gear 29, and is supported by a pulley shaft 30a affixed to the lower part of the rail plate 24 by crimping as shown in FIG. 14. The front storage portion 13 has a pair of laterally arranged front chassis 32 formed on the bottom 11b of the body case 11 as an integral body therewith. The inner space defined by the two chassis 32 is divided by a top plate 33 and magazine tables 34 into a plurality of levels, each of which serves as a magazine 35. Each disk 12 is placed on a magazine tray 36 which has a shape shown in FIGS. 8 and 9. Each magazine 35 is adapted to store numerous disks 12 which are respectively placed on these magazine trays 36 which are vertically arranged. As shown in FIG. 14, a handle 37 on the front face of each magazine 35 permits the magazine 35 to be pulled out after opening a front door 38 of the body case 11.

In the same manner as the front storage portion 13, the rear storage portion 14 has a pair of laterally arranged rear chassis 40 formed on the bottom 11b of the body case 11 as an integral body therewith. Disposed in the inner space defined by the two chassis 40 is a pair of laterally arranged fixed racks 41 which form a plurality of shelves. Each shelf of the racks 41 is adapted to house a disk 12 which is placed on a magazine tray 36.

The conventional disk storage device shown in FIGS. 13 and 14 transports a disk as described herein. The access tray 19 is drawn out from the access mechanism 17. A disk 12 is then placed in the access tray 19. The access tray 19 is then pushed back into the access mechanism 17. In conjunction with this operation, a vertical motion drive motor 28 of the vertical motion drive mechanism 16 rotates the timing belt 25 through the worn gear 29 and the timing pulley 30, thereby elevating the transfer mechanism 15 to the same height as the access tray 19. Subsequently, the transfer mechanism 15 moves the disk 12 on the access tray 19 to the transfer mechanism 15.

After the disk 12 is moved to the transfer mechanism 15, the transfer mechanism 15 performs either one of the two transfer actions in accordance with the nature of the operation command.

A first transfer action transfers the disk 12 from or to a drive unit 20. A drive tray 21 is pulled out of a specified empty drive unit 20 according to a command to transfer the disk 12 to the drive unit 20. The transfer mechanism 15 moves to a location directly above the drive tray 2 that has been pulled out. The transfer mechanism 15 places the disk 12 on the drive tray 21. Thereafter, the drive tray 21 is retracted into the drive unit 20, and reading and/or writing of the disk 12 is performed. Similarly, the disk 12 can be received from the drive unit 20 in the reverse order of the above described process.

The other transfer action transfers the disk 12 back and forth between the transfer mechanism 15 and either a magazine 35 or the racks 41. According to a command, the transfer mechanism 15 containing the disk 12 moves either to a location corresponding to the magazine 35 at the front or a magazine tray 36 of the racks 41 at the rear of the body case. The transfer mechanism 15 then places the disk 12 either on the empty magazine 35 or the magazine tray 36. Through repetition of this action by the transfer mechanism 15, a plurality of disks 12 may be successively housed in the magazine 35 or magazine trays 36 of the racks 41 in the body case 11. Similarly, receiving a disk 12 from either a magazine 35 or the racks 41 is accomplished by reversing the order of the above described process.

The processes described above relate to cases where disks 12 are handled one at a time. The processes described above are inconvenient because too much time and labor is required when there is a large number of the disks 12 are to be processed by the access mechanism 17. This problem may be overcome by pulling out a magazine 35 itself from the body case 11 together with a plurality of magazine trays 36 that are contained in the magazine 35. The disks 12 can then be exchanged, replaced and/or reordered outside of the body case 11, and the magazine 35 can then be inserted back into the body case 11. By opening the front door 38, each and every magazine 35 disposed at the front part of the body case 11 can be moved into or out of the body case 11 as shown in FIG. 14.

As described above, according to the structure shown in FIGS. 13 and 14, it is possible to move the magazines 35 located at the front part of the body case 11 in and out of the body case 11. However, the racks 41 located at the rear part of the body case 11 are affixed to the case body 11 and cannot be moved. Therefore, when transferring disks 12 to or from magazine trays 36 of the racks 41, the disks 12 can be moved only one at a time by means of the access mechanism 17. It is highly inconvenient to insert, eject or exchange a large number of disks 1 one at a time since this requires a large amount of time and effort.

Another conventional storage device is shown in FIG. 15. This structure is basically the same as the above example in that a front storage portion 13 and a rear storage portion 14, which house disks 12, together with drive units 20, are disposed in the body case 11. The front storage portion 13 is located at the front part of the body case 11, and the rear storage portion 14 and the drive units 20 are located at the rear part of the body case 11. The transfer mechanism 15 is vertically moved by a vertical motion drive mechanism 16 disposed between the front storage portion 13 and the members located at the rear part, i.e. the rear storage portion 14 and the drive units 20. However, a double-hinged side door 42 is provided at the right side of the body case 11, where the vertical motion drive mechanism 16 is absent. Magazines 43, 44, which respectively constitute the front storage portion 13 and the rear storage portion 14, are adapted to be pulled out to the right.

The operation of the apparatus in FIG. 15 is discussed hereunder. The magazines 43, 44, respectively located at the front a rear parts of the body case 11 can be pulled out after opening the side door 42 at the side of the body case 11. By removing the magazines 43, 44, it is possible to conduct setting, ejection or exchange of all the disks 12 in a magazine collectively. The double hinged door 42 makes it possible to remove the rear magazine 43 and conduct setting, ejecting or exchange of the disks 12 located in the rear of the body case 11. The above discussed structure can reduce working time and make operation more convenient.

However, there are restrictions concerning the site of installation for an apparatus having the above structure because a double-hinged side door 42 requires a large clearance for opening and closing. Consequentially, it is not difficult to install the apparatus so that the side door 42 is located adjacent to a wall or another apparatus.

A disk changing apparatus of this type is often installed under a desk or in a similar space. The above structure requires that when changing magazines 43,44 is desired it is necessary for a user to crawl under the desk or take the body case 11 out of the space under the desk to expose the side door 42 to allow the user to open the side door 42 and change the magazines. However, as a power cable and various cables for exchanging data (not shown in the drawings) are connected to the back of the body case 11, moving the apparatus carelessly gives rise to considerable danger of these cables being inadvertently removed. Inadvertent removal of the cables is undesirable because it jeopardizes the safety of the apparatus and the data.

OBJECT AND SUMMARY OF THE INVENTION

It is an object of the present invention to overcome the drawbacks and limitations of the prior art.

It is another object of the present invention to provide a storage device apparatus where a large number of disks can be collectively inserted, ejected or exchanged in both a front and rear storage area in a convenient manner of use.

When there is a need for insertion, ejection or exchange of a large number of disks 12 collectively, the structure which calls for opening, the front door 38 of the body case 11 enables the operation for each magazine 35 of the front storage portion 13 of the body case 111 on a magazine-lot basis, but operation for disks in the rear storage portion 14 requires a lot of time and effort, because magazine-lot operation of magazines 35 in the rear storage portion is impossible. On the other hand, the structure which calls for opening the side door 42 of the body case 11 enables the magazine-lot operation of the magazines 35 both in the front storage portion 13 and the rear storage portion 14. However, as there are restrictions concerning the site of installation, the structure presents other problems in that it is inconvenient to handle and also unfavorable in view of safety of the apparatus.

In order to solve the above problem, an object of the present invention is to provide a storage device for recordable media which is free of restriction of installation site, much more convenient to handle and can be installed at a desired location.

Briefly stated, a storage device for recordable media provides for case of access for replacing disks, and transportability with ease of installation at any desired site. A front storage portion and a rear storage portion both of which include magazines are arranged in a body case. Each magazine is capable of containing a plurality of disks. A transfer mechanism freely transfers disks from or to magazines of the front storage portion or the rear storage portion. A vertical motion drive mechanism moves the transfer mechanism to a desired transfer position to transfer a disk to or from a magazine. The transfer mechanism can be moved to a retracted position at a sufficient distance from the magazines so that an extension mechanism can move the front and rear storage portions along the body case. After the vertical motion drive mechanism moves the transfer mechanism to the retracted position, the extension mechanism permits the front storage portion and the rear storage portion to be pulled out of the body case so that each magazine itself can be inserted, removed or exchanged.

According to an embodiment of the present invention, there is provided, a recordable media storage device, comprising: a body case, a plurality of storage portions in the body case, each of the storage portions including at least one magazine, each of the magazines being effective to store a plurality of recordable media therein, a transfer mechanism, the transfer mechanism including means for arbitrarily transferring the recordable media from and to magazines of the storage portions, drive means for moving the transfer mechanism to a desired transfer position corresponding to a target magazine and to a retracted position separated from the magazines, and an extension means for moving the storage portions along the body case. The above storage device is capable of moving the transfer mechanism to the retracted position by activating the drive means and then pulling the storage portions out of the body case by opening the extension means, thereby permitting each magazine to be wholly inserted, removed or exchanged.

According to another embodiment of the present invention, there is provided, a recordable media storage device, comprising: a body case having a front and rear portion, at least one front storage portion in the body case, at least one rear storage portion in the body case, each of the front storage portion and the rear storage portion including at least one magazine, each of the magazines including means for storing a plurality of recordable media therein, a transfer mechanism, the transfer mechanism arbitrarily transferring the recordable media from and to the magazines of the storage portions, a drive mechanism including means for moving the transfer mechanism to a desired transfer position corresponding to a target magazine and to a retracted position separated from the magazines, and an extension mechanism for moving said storage portions along the body case. The extension mechanism is a pair of slide rails such that extending the mechanism allows access to the rear portions of the storage area, whereby insertion, removal, and replacement of magazines can be accomplished with great facility.

According to still another embodiment of the present inventions there is provided, a recordable media storage device, comprising: a body case having a front and rear portion, at least one front storage portion in the body case, at least one rear storage portion in the body case, each of the front storage portion and the rear storage portion including at least one magazine, each of the magazines including means for storing a plurality of recordable media therein, a transfer mechanism, the transfer mechanism arbitrarily transferring the recordable media from and to the magazines of the storage portions, a drive mechanism including means for moving the transfer mechanism to a desired transfer position corresponding to a target magazine and to a retracted position separated from the magazines, an extension mechanism for moving the storage portions along the body case, the extension mechanism is a pair of moveable slide rails, the slide rails being moveable along the body case, to allow access to the rear portion of the body case, thereby permitting insertion, removal, or replacement of the media in the at least one rear storage portion in the rear of the body case, a locking mechanism, and the locking mechanism including means for locking the storage portions in a locked state at a specified position in the body case and arbitrarily releasing the storage portions from the locked state. Thus, by means of the locking mechanism, the storage portions may be locked at a specified position in the body case, and released from the locked state whenever it is necessary to pull magazines out of the body case.

The above, and other objects, feature and advantages of the present invention will become apparent from the following description read in conjunction with the accompanying drawings, in which like reference numerals designate the same elements.

DETAILED DESCRIPTION OF THE PREFERRED EMBODIMENT

Figure 1:
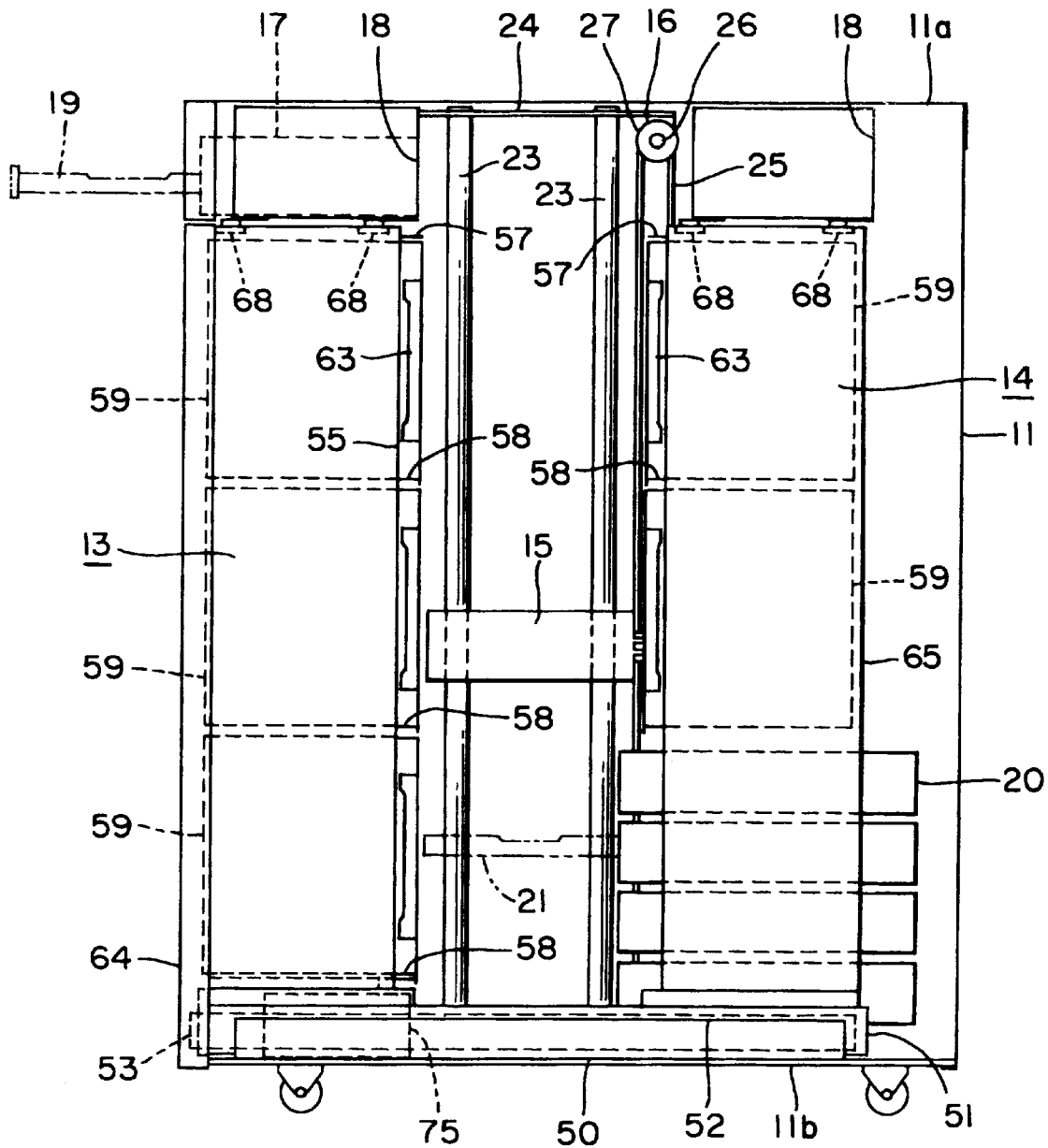
FIG. 1 is a sectional view of a side view of a storage device for recordable media according to an embodiment of the present invention.
Figure 2:
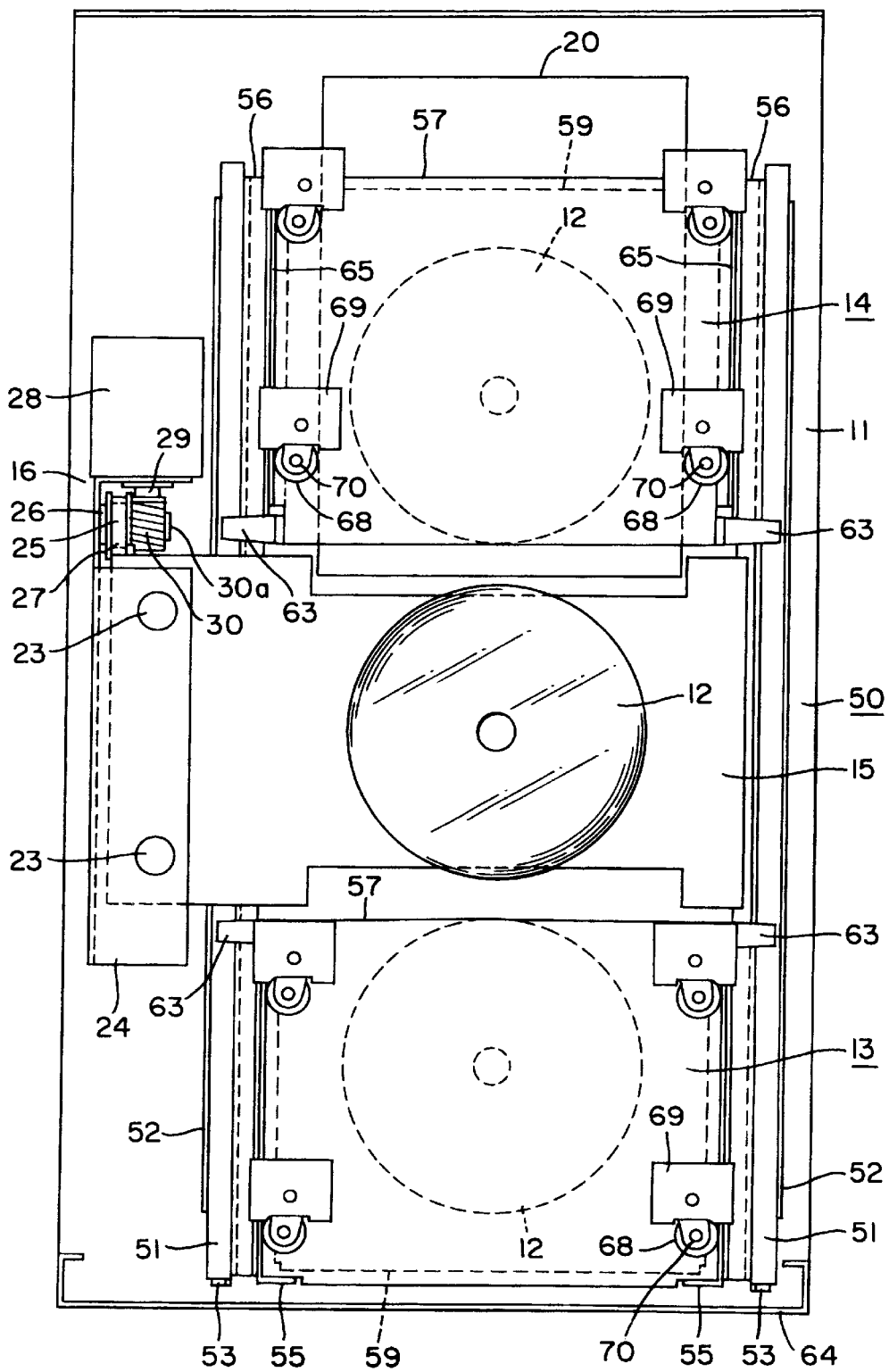
FIG. 2 is a top view of the same.
Figure 3:
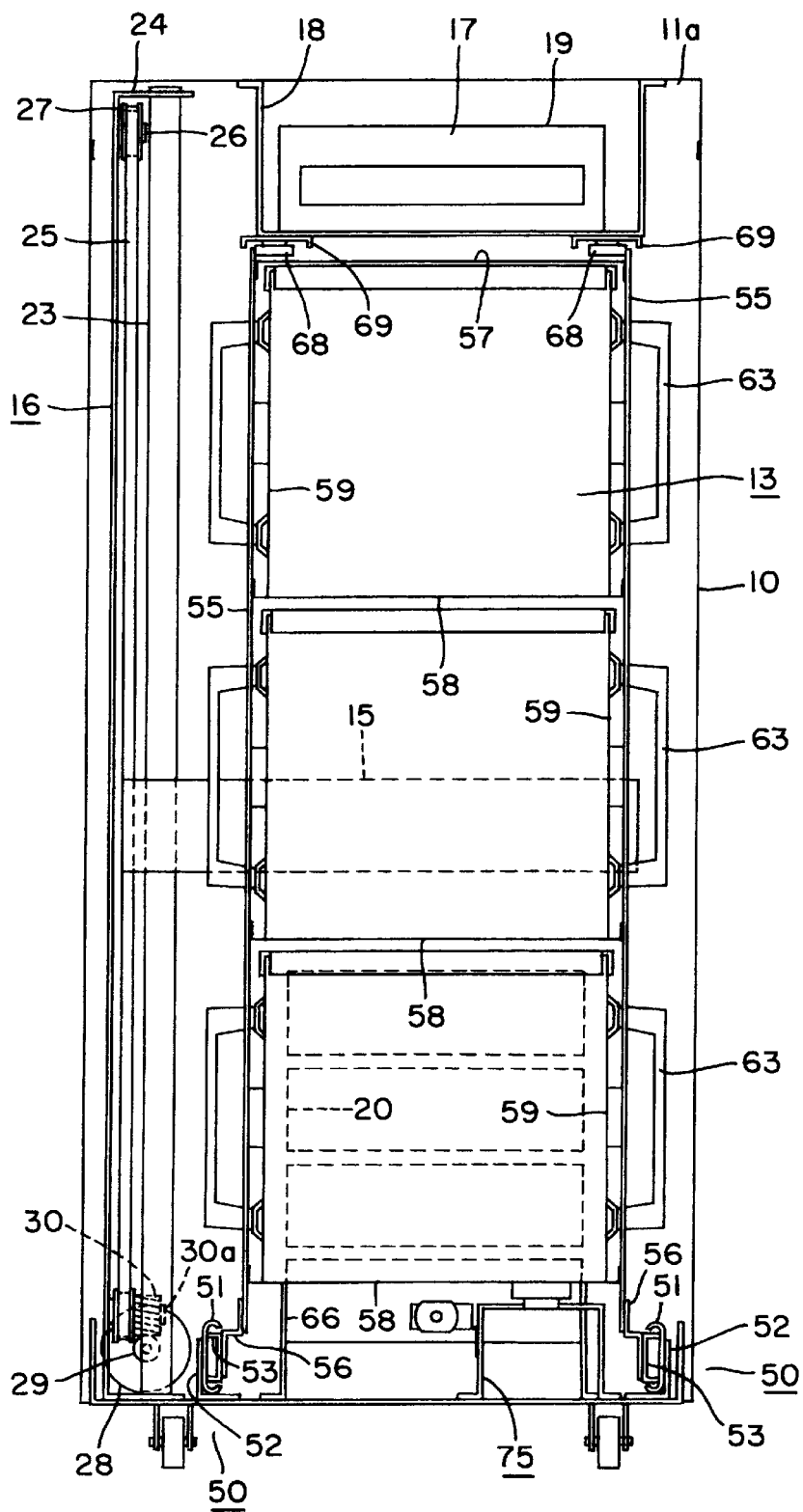
FIG. 3 is a front view of the same.

Referring to FIGS. 1–3, a disk changing apparatus includes a body case 11 having a front storage portion 13 and a rear storage portion 14. Storage portions 13 and 14 store vertically stacked disks 12, i.e. recordable media. A transfer mechanism 15 is moveable up and down by a vertical motion drive mechanism 16. The vertical motion drive mechanism 16 is disposed between the front storage portion 13 and the rear storage portion 14. The transfer mechanism 15 holds a disk 12 which it moves vertically by vertical drive mechanism 16 to a desired transfer position. The desired transfer position of the transfer mechanism 15 is a location where the disk 12 is substantially aligned with a location of the front storage portion 13 or the rear storage portion 14.

An access mechanism 17 for insertion and removal of disks 12 is disposed above the front storage portion 13. The access mechanism 17 is attached to a support plate 18 mounted on a ceiling surface 11a of the body case 11. The access mechanism 17 includes an access tray 19 which can be pulled out of the body case 11 and thus transfer disks 12 back and forth between the exterior of the apparatus and the transfer mechanism 15. A plurality of drive units 20 (for example four units), for magnetically or optically performing reading and/or writing of disks 12, are vertically stacked and disposed below the rear storage portion 14. Each drive unit 20 has a driving tray 21 and transports a disk 12 from and to the transfer mechanism 15.

The transfer mechanism 15 is supported and guided to move up and down by two vertically extending rails 23. As shown in FIG. 2, the two rails 23 are disposed to the left side of the interior of the body case 11, with the upper and the lower ends thereof each one attached to one of rail plates 24. Rail plates 24 are respectively affixed to the ceiling surface 11a and to a bottom surface 11b of the body case 11. The vertical motion drive mechanism 16 includes a vertically extending timing belt 25 and is adapted to vertically move the transfer mechanism 15, which is affixed to the timing belt 25.

Referring to FIGS. 2 and 3, the timing belt 25 is wrapped around an upper pulley 27 and a timing pulley 30. The upper pulley 27 is supported by a pulley shaft 26 crimped to the upper part of the rail plate 24. The timing pulley 30 is rotated by a vertical motion drive motor 28 through a worm gear 29. The timing pulley 30 is supported by a pulley shaft 30a crimped to the lower part of the rail plate 24.

An extension mechanism 50 for guiding the front and rear storage portions 13,14 in the fore-and-aft direction with respect to the body case 11 is provided on the bottom surface 11b of the body case 11. The extension mechanism 50 includes a pair of laterally arranged fixed slide rails 51 extending in the fore-and-aft direction with respect to the body case 11. As shown in FIG. 3, the fixed slide rails 51, each of which has a C-shaped cross section, are oppositely arranged so that their C-shaped open grooves face each other. The fixed slide rails 51 are solidly affixed to the bottom surface 11*b* of the body case 11 with respective support plates 52 therebetween.

Figure 4:
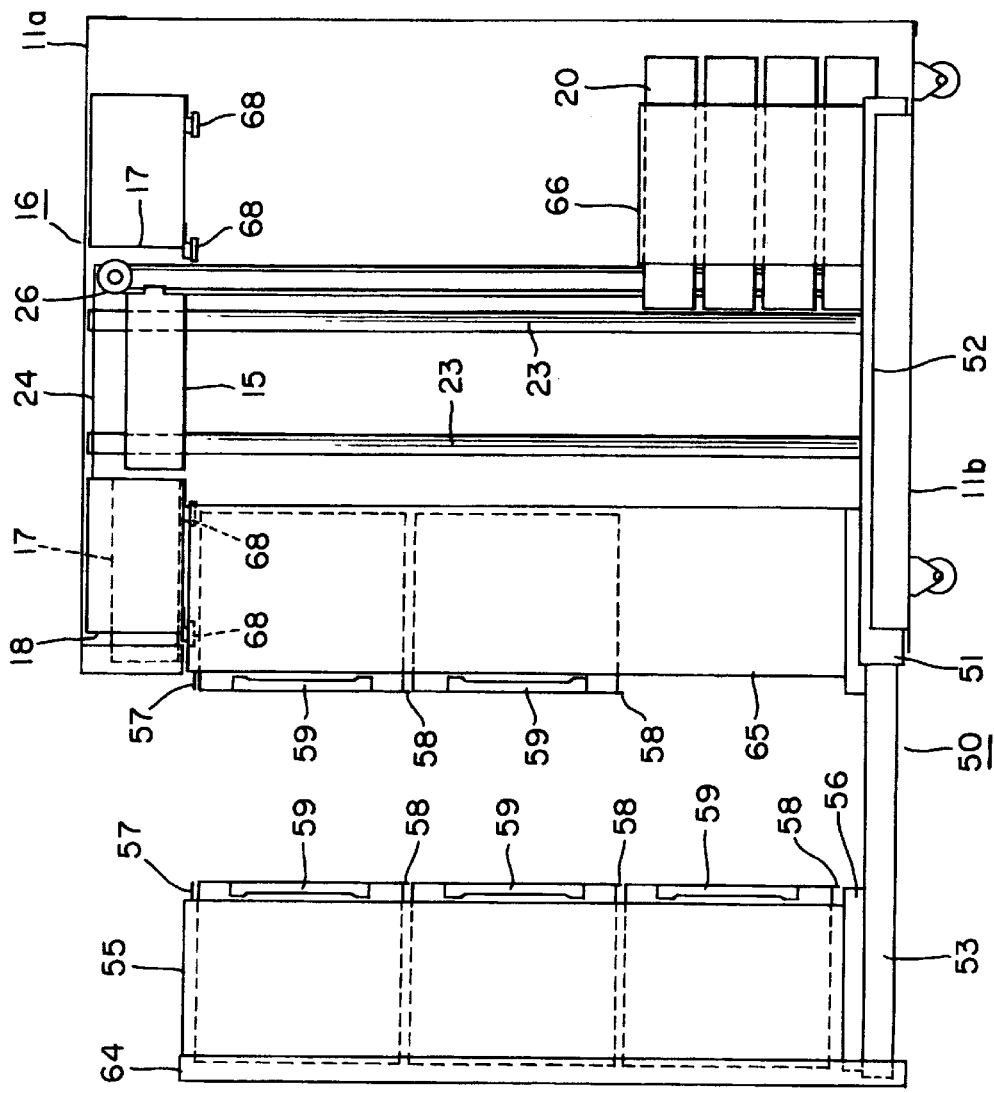
FIG. 4 is a side view of the same in the extended position.

Referring to FIGS. 3 and 4, a movable slide rail 53 is supported in the C-shaped groove of each fixed slide rail 51. Each moveable slide rail 53 extends along substantially the entire length of the slide rail 51 in such a manner as to be capable of sliding along the length of the rail 51.

Figure 6:
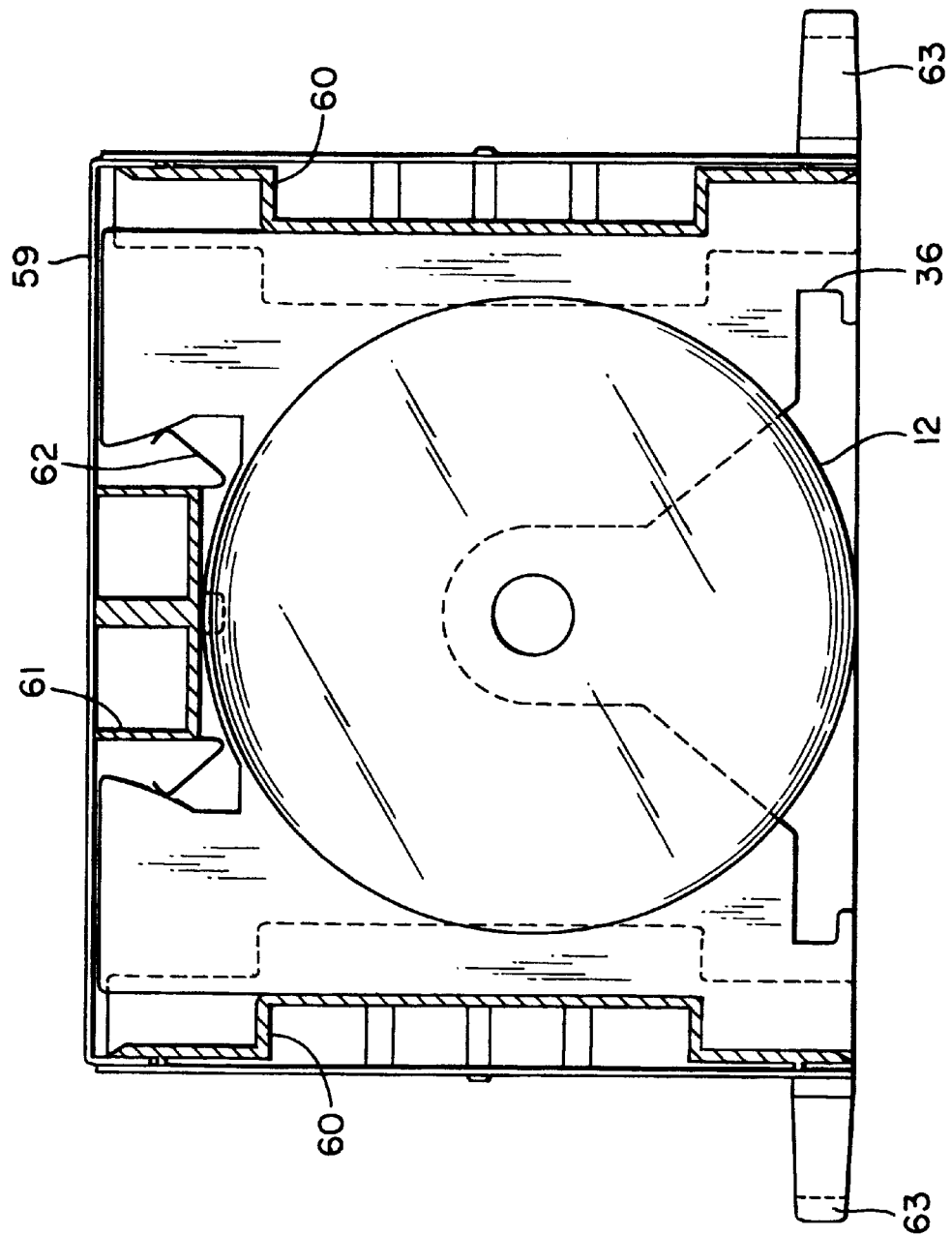
FIG. 6 is a top view of a magazine of the same.
Figure 7:
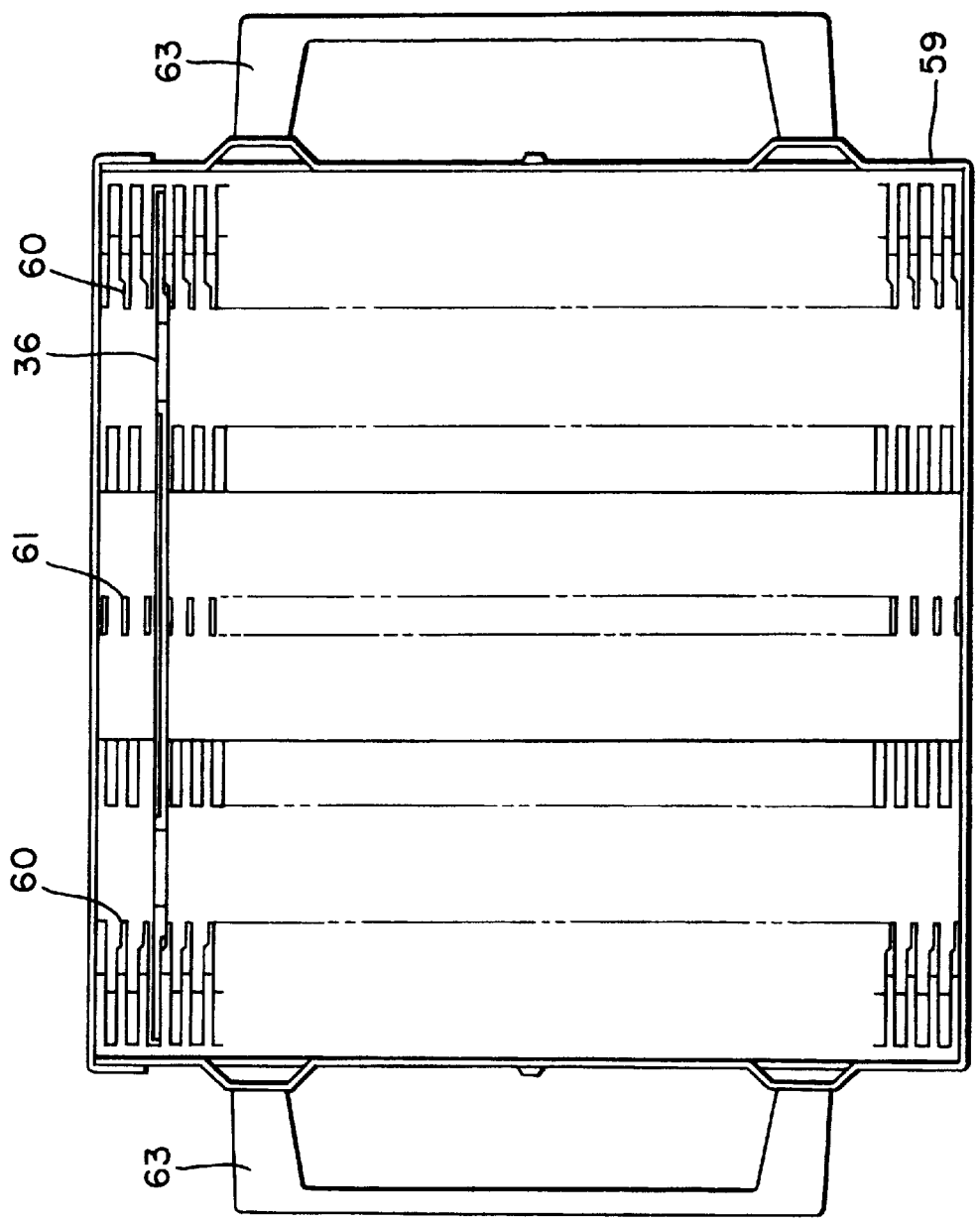
FIG. 7 is a front view of the magazines of the same.

The front storage portion 13 has a pair of laterally arranged front chassis 55. The lower end of each front chassis 55 is integrally joined through a holder 56 to the corresponding slide rail 53. As shown in FIGS. 1 and 3, the space between the two front chassis 55 is divided by a top plate 57 and magazine tables 58 into a plurality of levels, for example three levels. A magazine 59 shown in FIGS. 6 and 7 is formed at each level.

Figure 8:
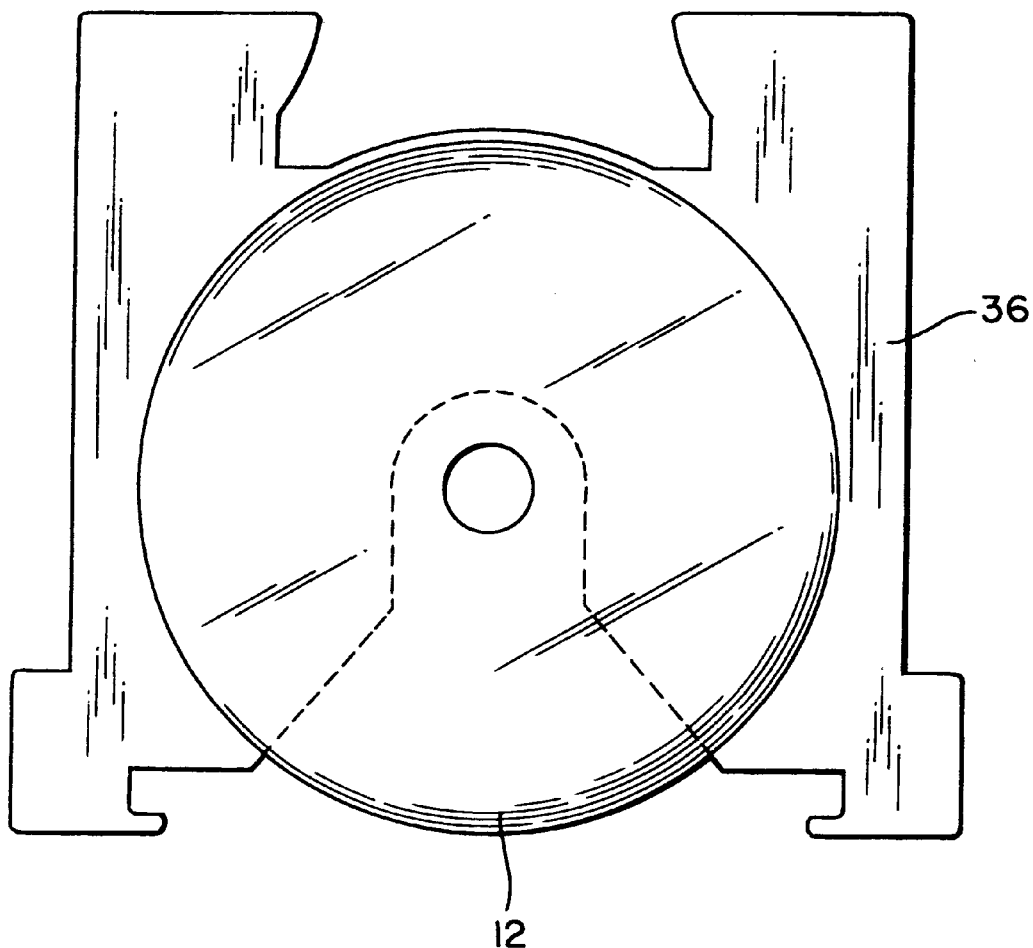
FIG. 8 is a top view of a magazine tray of the same.
Figure 9:
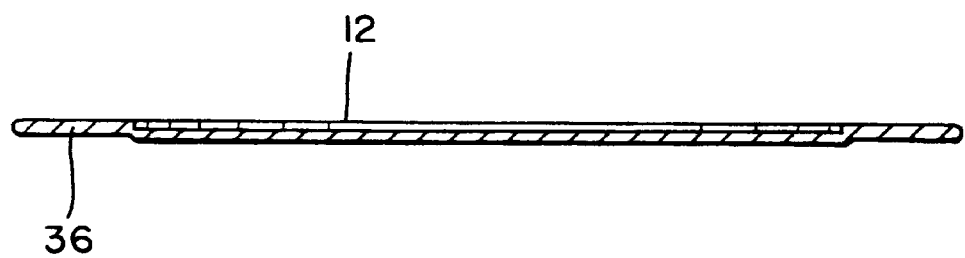
FIG. 9 is a front view of the magazine tray of the same.

In the same manner as the conventional structure previously described, each disk 12 is placed on a magazine tray 36 which has a shape shown in FIGS. 8 and 9. Each magazine 59 is adapted to store numerous disks 12 respectively placed on these magazine trays 36 that are vertically arranged. More precisely, each magazine 59 include magazine racks 60, which are respectively arranged to the right and left sides of the magazine 59 and adapted to support the lateral edges of the magazine trays 36. A rear rack 61 engages an indentation formed at the rear part of each magazine tray 36 and thus supports the magazine tray. Tray holding springs 62 are provided at the rear part of each magazine 59. Each magazine tray 36 carries a single disk 12 to be stored on each respective shelf formed by the three racks 60,61.

Provided on each lateral side of each magazine 59 is al handle 63 for removing the magazine 59 from either one of the front and rear storage portions 13 and 14. In addition, a front case 64 is integrally attached to the front of the front chassis 55.

Similarly, the rear storage portion 14 has a pair of laterally arranged rear chassis 65. In the same manner as the front chassis 55 the lower end of each rear chassis 65 is integrally joined through the holder 56 to the corresponding slide rail 53. The space between the two rear chassis 65 is divided by a top plate 57 and magazine tables 58 into a plurality of levels. A magazine 59, as shown in FIG. 6, is provided at each of the levels of the magazine tables 58. The magazines 59 between the rear chassis 65 are identical to those between the front chassis 55. The front and rear magazines are oppositely arranged so that their ends through which disks 12 are inserted or removed face each other.

Referring to FIGS. 1 and 3, drive units 20 are disposed at the lower part of the space between the rear chassis 65. The drive units 20 are affixed to the bottom 11*b* of the body case 11 by means of drive holders 66 which are separated from the rear chassis 65.

A support plate 18 is mounted on a ceiling surface 11*a* of the body case 11 above the front storage portion 13 in order to support the access mechanism 17 for disks 12. The underside of the support plate 18 is located near the upper ends of the front chassis 55. In the same manner as the support plate 18, another support plate 18 is disposed above the rear storage portion 14 as shown in FIG. 1. The underside of the latter support plate 18 is located near the upper ends of the rear chassis 65.

A total of eight guide rollers 68 are attached to the undersides of the aforementioned front and rear support plates 18, 18 as shown in FIG. 2. Two laterally arranged rollers are coupled to the front and rear parts of each support plate 18. As shown in FIGS. 2 and 3, these guide rollers 68 are respectively in contact with the upper inner sides of the front chassis 55 and the rear chassis 65. The guide rollers 68 prevent the storage portions 13, 14 from shaking side to side when the storage portions are moved.

Figure 12:
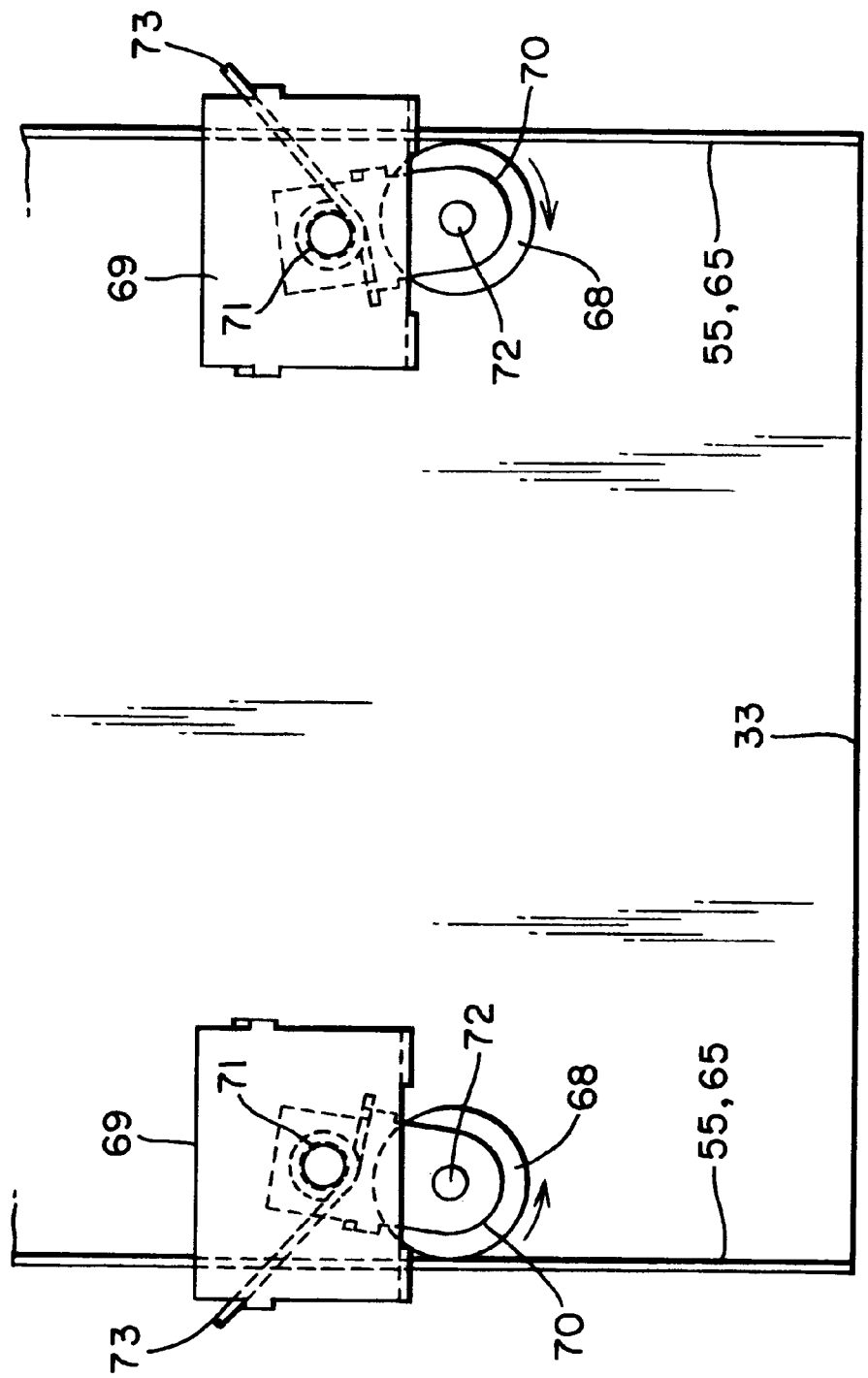
FIG. 12 is an enlarged top view of the portion where guide rollers of the same are provided.
Figure 13:
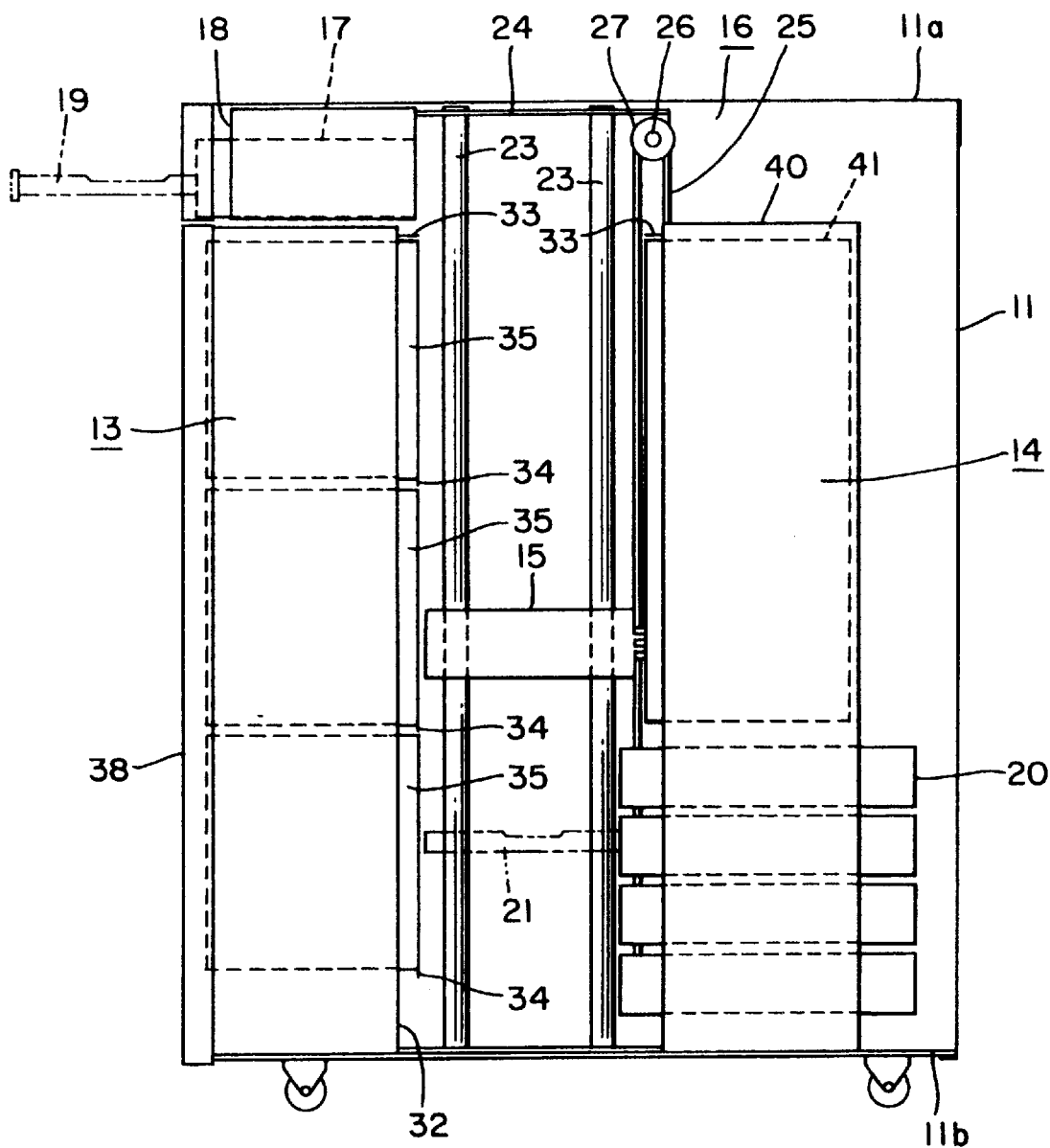
FIG. 13 is a side view of an example of conventional storage devices.
Figure 14:
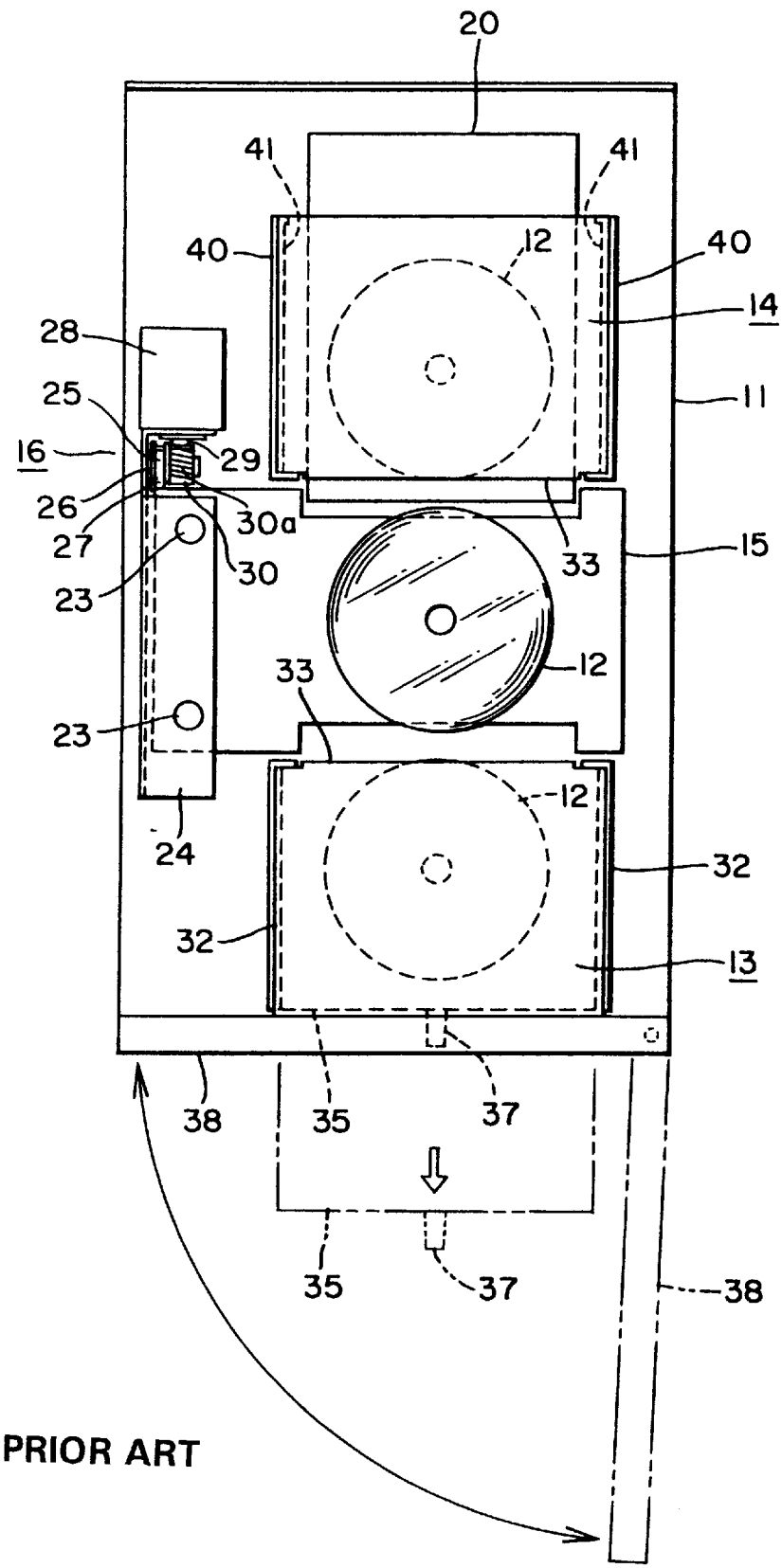
FIG. 14 is a top view of said conventional storage device.
Figure 15:
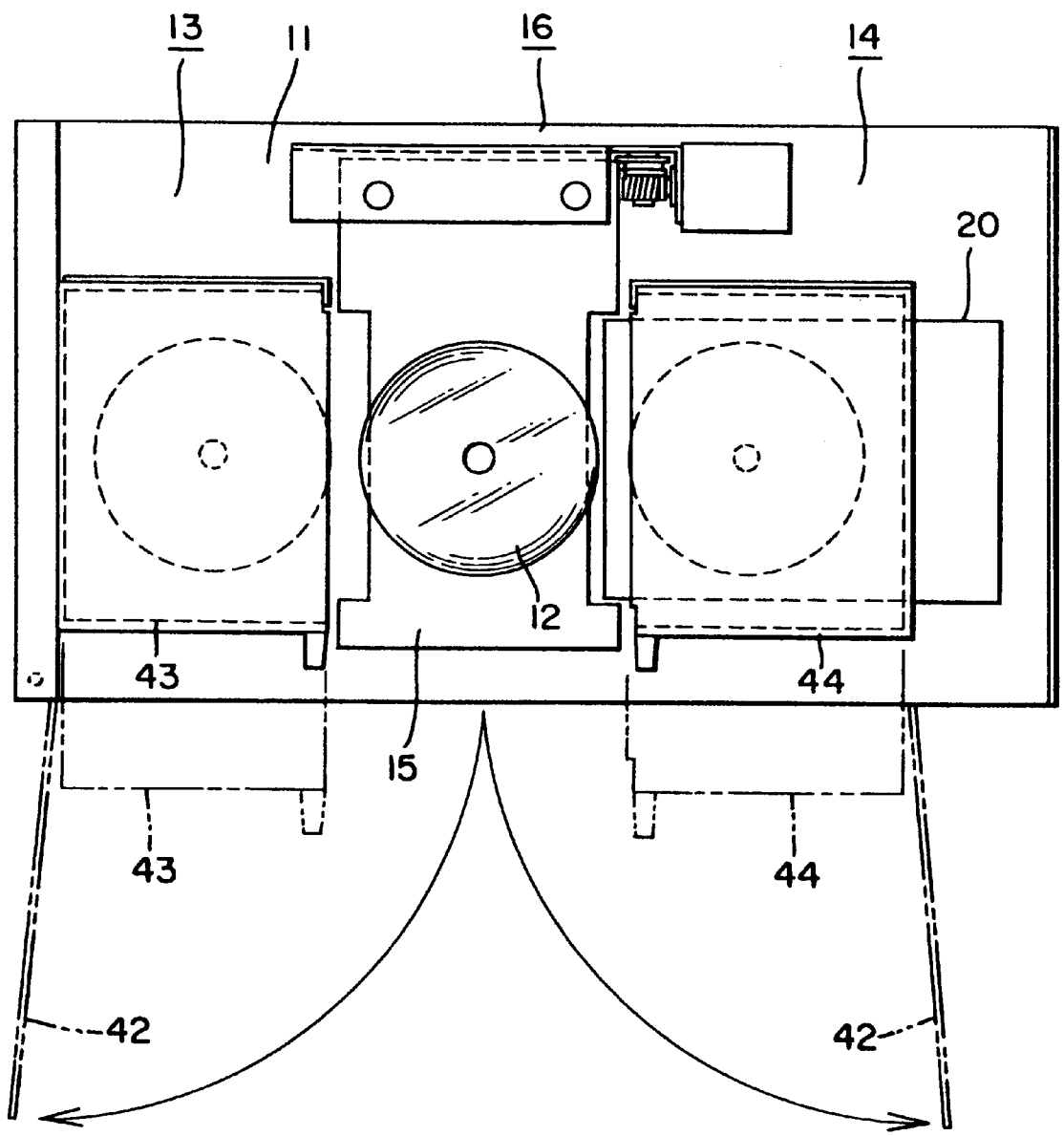
FIG. 15 is a side view of another example of conventional storage devices.

The guide rollers 68 are connected through roller holders 70 to roller plates 69 attached to the undersides of support plates 18,18. As shown in FIG. 12, each roller holder 70 is in the shape of an arm and rotatably supported at its base by a holder shaft 71, which is affixed to each respective roller plate 69 by crimping. A roller shaft 72 is affixed to the end of each roller holder 70 by crimping, and the associated guide roller 68 is rotatably attached to this roller shaft 72. Furthermore, each roller holder 70 is exposed to outward biasing force applied by a roller spring 73 wound around the holder shaft 71, so that the roller holder 70 is pressed against the inner side face of a front chassis 55 or a rear chassis 65.

Figure 10:
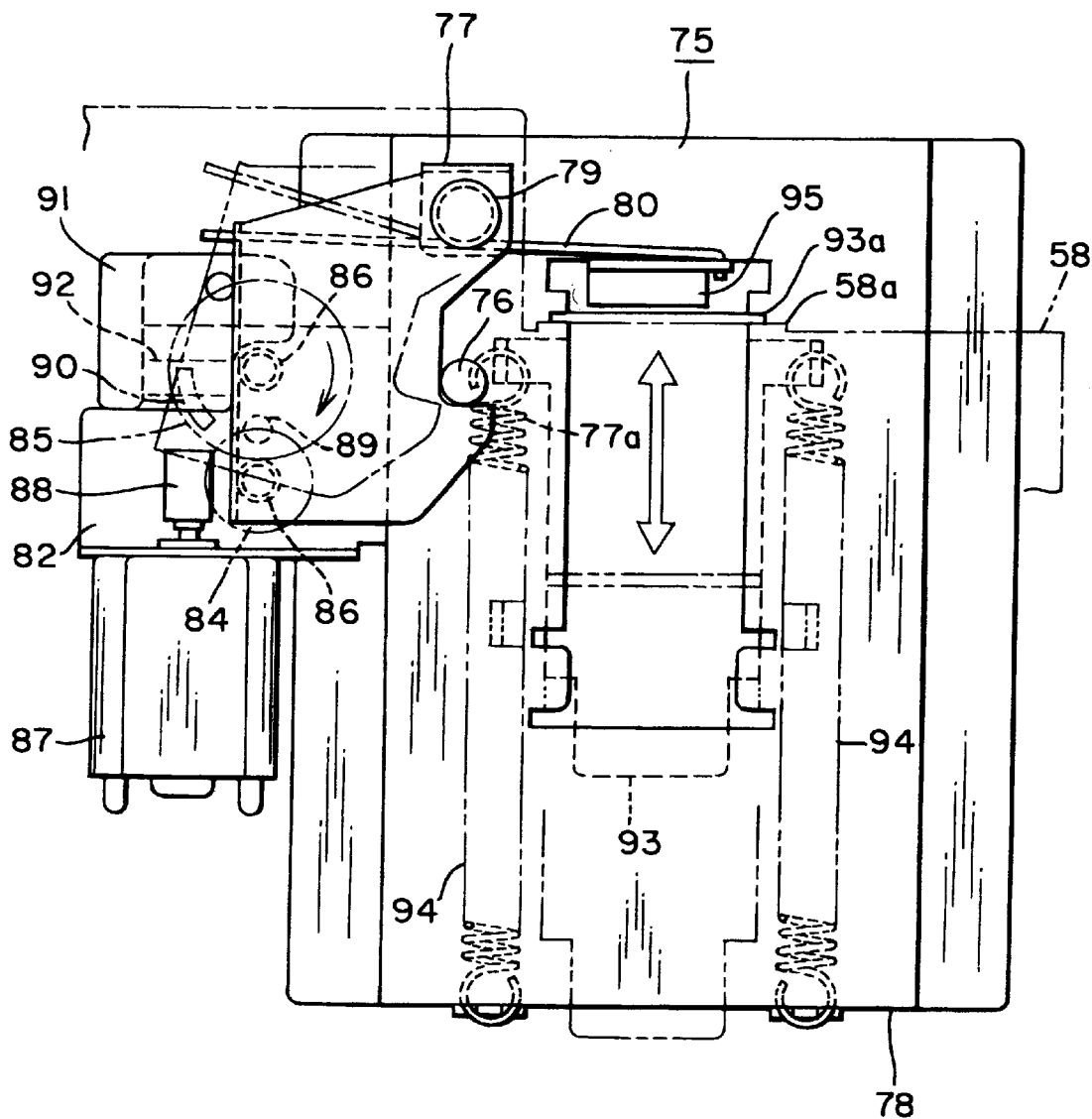
FIG. 10 is an enlarged top view of a locking mechanism of the same.
Figure 11:
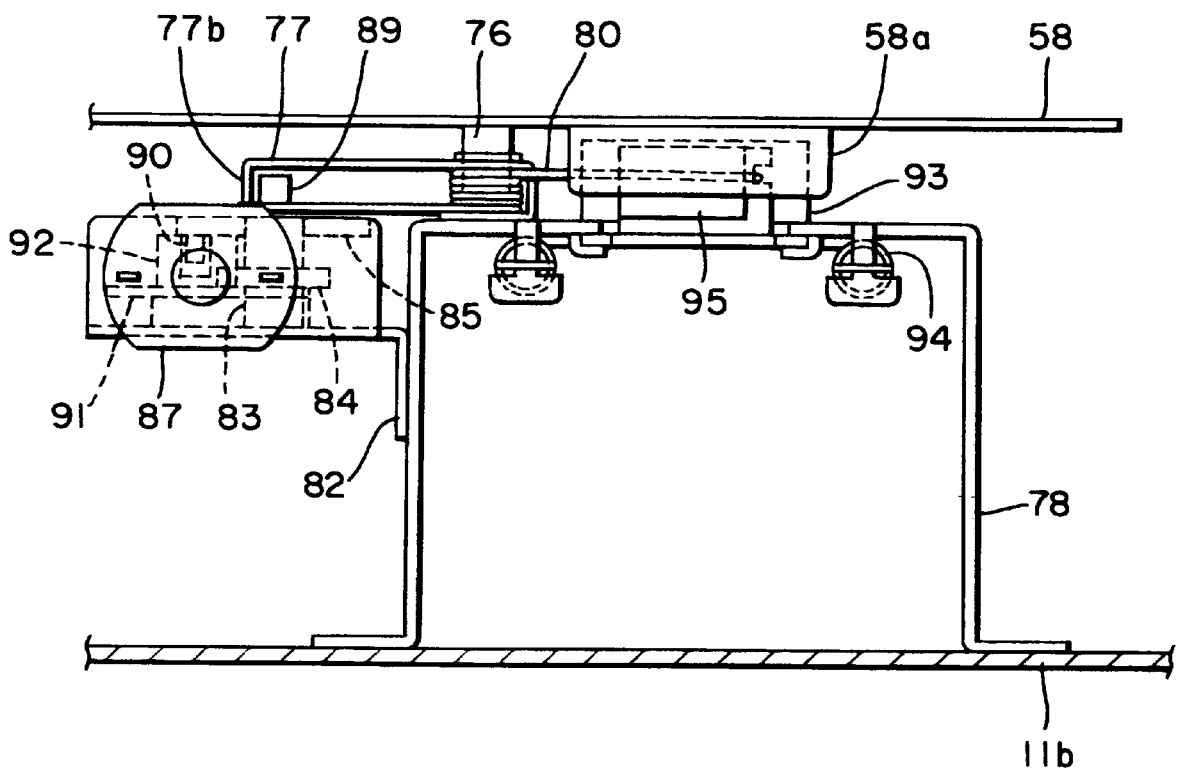
FIG. 11 is an enlarged front view of the locking mechanism of the same.

As shown in FIGS. 1 and 3, a locking mechanism 75 is provided under the front storage portion 13. The locking mechanism 75 is formed between the bottom 11*b* of the body case 11 and the lower surface of the magazine table 58 at the bottom of the front storage portion 13. The locking mechanism 75 is adapted to respectively lock the front storage portion 13 and the rear storage portion 14 at specified positions in the body case 11 and release the front storage portion 13 and/or the rear storage portion 14 from their respective locking positions at the user's discretion. As shown in FIGS. 10 and 11, the locking mechanism 75 includes a stopper shaft 76 projecting downward affixed to the underside of the magazine table 58, while the body ease 11 includes a latch 77 adapted to removably engage the stopper shaft 76.

A locking table 78 is affixed to the bottom 11*b* of the body case 11, and the latch 77 is rotatably supported by a latch shaft 79 crimped to the top of the locking table 78. The latch 77 includes a stop portion 77*a* to engage the stopper shaft 76. The latch 77 is urged counterclockwise by a latch spring 80 in the direction as to engage the stopper shaft 76. An unlocking portion 77*b* is formed by bending the left edge of the latch 77 downward.

The unlocking mechanism for releasing the latch 77 from the locked position is formed on a gear plate 82, which is integrally attached to a side of the locking table 78. To be more precise, two gear shafts 83 are crimped to the top of the gear plate 82. A first gear 84 and a second gear 85 interlocked with each other are rotatably fitted around the gear shafts 83 and respectively stopped by E-rings 86. An unlocking motor 87 is disposed in front of the gear plate 82. A worm gear 88, fitted into the rotation shaft of the motor 87 is interlocked with the first gear 84 so that rotation of the motor 87 rotates the first gear 84 and the second gear 85.

An unlocking boss 89 and a rib 90 for detecting a stop position are respectively provided on the upper surface and the underside of the second gear 85 as an integral body with the second gear 85. As a result of rotation of the second gear 85, the boss 89 contacts the unlocking portion 77*b* of the latch 77, thereby rotating the latch 77 clockwise, so as to release the latch 77 from the stopper 76. In association with the rib 90, a sensor 92 is mounted on a base plate 91 attached to the gear plate 82. The sensor 92 detects the passage of the rib 90, rotated with the second gear 85, to a specified angle where the latch 77 becomes detached from the stopper shaft 76, thereby causing the unlocking motor 87 to stop.

Referring to FIGS. 10 and 11, an ejection mechanism formed on the locking table 78, is adapted to move the movable slide rails 53 forward by a certain distance together with the front storage portion 13 and the rear storage portion 14. The storage portions 13 and 14 are joined to slide rails 53. To be more specific, an ejection plate 93 is supported on the back face of the locking table 78 so that the ejection plate 93 is capable of smoothly sliding in the fore-aft-aft direction. The ejection plate 93 has a catching portion 93a resting on the rear face of a downwardly extending bent portion 58a of the magazine table 58. The catching portion 93a is formed by bending the rear end of the ejection plate 93 upward. The ejection plate 93 is constantly biased forward by ejection springs 94 stretched between the front end of the locking table 78 and the ejection plate 93.

The locking table 78 is provided with a cushion member 95, at a location facing the rear end of the ejection plate 93, to reduce the shock received by the ejection plate 93 when the plate slides rearward to engage the stopper shaft 76 with the latch 77.

Next, the function of the embodiment described above is explained hereunder.

When insertion, ejection or exchange of disks 12 is performed one disk at a time, each disk 12 may be transferred back and forth between the outside of the apparatus and the transfer mechanism by means of the access mechanism 17, or between the transfer mechanism and any member selected from among the front and rear magazines 59 and the drive units 20 by means of the transfer mechanism.

The above actions relate to occasions where disks 12 are handled one at a time. On the other hand, when a large number of disks 12 are inserted into, ejected from or exchanged with the body case 11 collectively, this operation is done by inserting or removing magazines 59 after pulling the front storage portion 13 and the rear storage portion 14 out of the body case 11.

A computer (not shown) issues commands to control the functions of the recordable media storage device. When an unlocking command is issued, the vertical motion drive motor 28 of the vertical drive mechanism 16 is actuated. Upon actuating the motor, the transfer mechanism 15, which is affixed to the timing belt 25 through the worm gear 29 and the timing pulley 30, is moved to a location opposite the access mechanism 17, i.e. the retracted position away from the front storage portion 13 and the rear storage portion 14.

Thereafter, the unlocking motor 87 of the locking mechanism 75 is actuated to rotate the second gear 85 through the worm gear 88 and the first gear 84. This rotation continues until the rib 90 intercepts the detector light of the sensor 92. As a result, the boss 89 comes into contact with the unlocking portion 77b of the latch 77 and pushes it to the left as viewed in FIG. 10, thereby rotating the latch 77 clockwise around the latch shaft 79 against the force of the latch spring 80 so that the stopper shaft 76 is released from the stop portion 77a.

The magazine table 58, to which the stopper shaft 76 is attached engages the catching portion 93a of the ejection plate 93 with the bent portion 58a of the magazine table 58 therebetween. The ejection plate 93 is constantly exposed to the force applied in the forward direction by the ejection springs 94. Therefore, as a result of the separation of the latch 77 from the stopper shaft 76, the tensile force of the ejection springs 94 moves the magazine table forward a certain distance. In other words, the magazine table 58 is completely disengaged from the latch 77.

Since the magazine table 58 is connected, together with the front chassis 55, to the movable slide rails 53, to which the rear chassis 65, too, are connected, both the front storage portion 13 and the rear storage portion 14 are released from the locked state.

Thereafter, by pulling the magazine table 58 by hand, the front storage portion 13 and the rear storage portion 14 move forward toward the front of the body case 11 as a result of the movable slide rails 53 sliding along the fixed slide rails 51, and stop at the position where all the magazines 59 of the front and rear storage portions 13,14 can be removed. The position where the front storage portion and rear storage portion stop moving may be the extended position shown in FIGS. 4 and 5.

Figure 5:
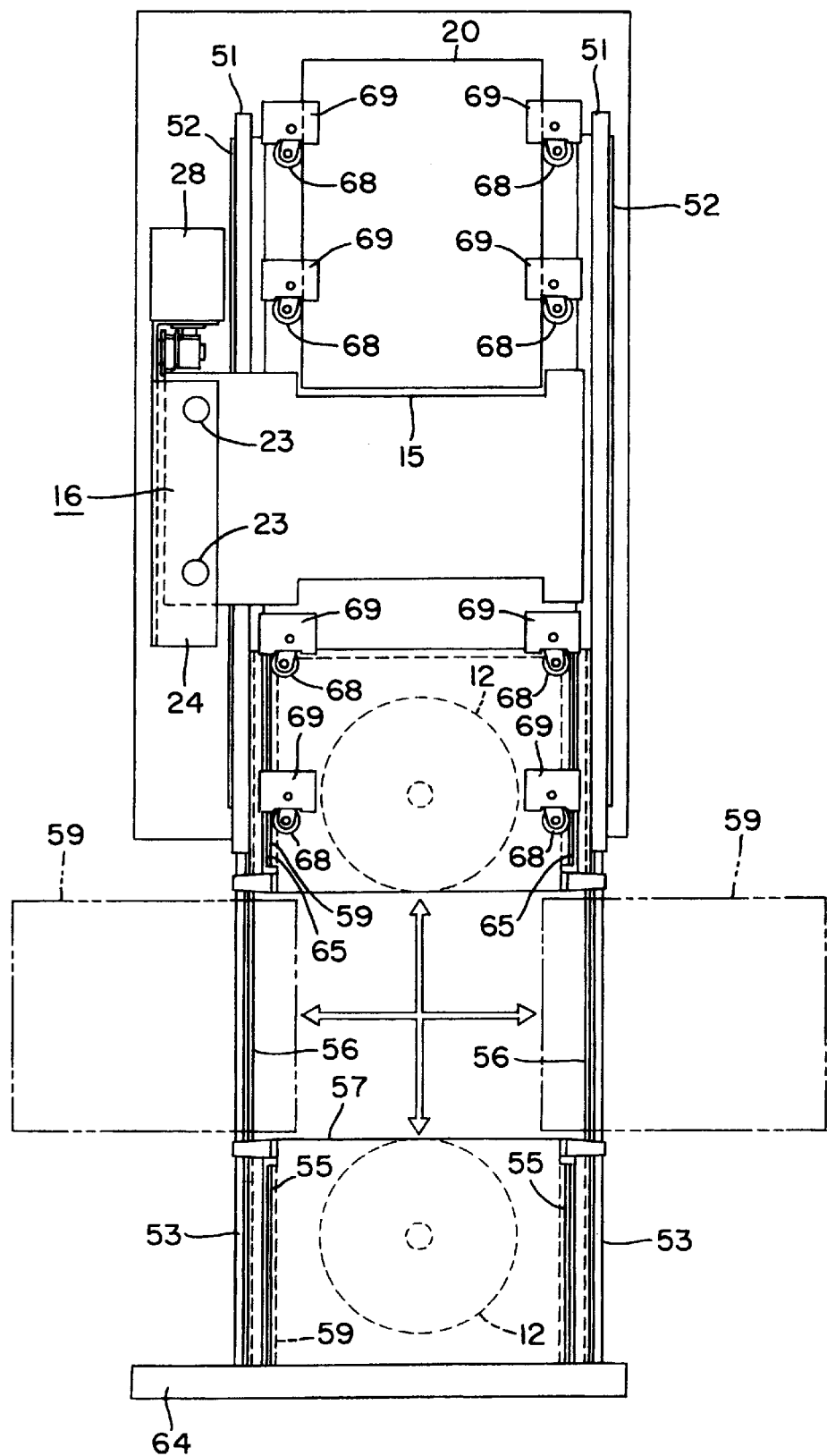
FIG. 5 is a top view of the same in the extended position.

When the front storage portion 13 and rear storage portion 14 are moved to the position shown in FIGS. 4 and 5, all the magazines 59 can be taken from or inserted into the apparatus by moving each magazine 59, by gripping the handle 63, from the front storage portion 13 or the rear storage portion 14 to the midpoint of the two storage portions and then to a side. Thus, the structure according to the invention permits magazines 59 to be handled at the side of the body case 11 where there are the fewest obstacles.

To return the front storage portion 13 and the rear storage portion 14 into the body case 11, it is sufficient to push the front case 64 into the body case 11 by hand. As a result of this operation, the movable slide rails 53 slide along the fixed slide rails 51, thereby moving the front storage portion 13 and the rear storage portion 14 into the body case 11. At that time, in the upper parts of the front storage portion 13 and the rear storage portion 14, the laterally arranged guide rollers 68 disposed at the upper part of the interior of the body case 11 are successively pressed against the upper inner sides of the rear chassis 65 and the front chassis 55 and guide the front storage portion 13 and the rear storage portion 14 while rolling, so that the front storage portion 13 and the rear storage portion 14 are smoothly inserted.

When the bent portion 58a of the bottommost magazine table 58 shown in FIGS. 10 and 11 comes into contact with the catching portion 93a of the ejection plate 93, the ejection plate 93 is pushed further inward against the force of the ejection springs 94. At that time, the stopper shaft 76 crimped to the magazine table 58 contacts the slanted portion of the front end of the latch 77 and becomes engaged in the stop portion 77a while rotating the latch 77 clockwise against the force of the latch spring 80. Thus, stopper shaft 76 is locked by the latch 77. As a result, the front storage portion 13 and the rear storage portion 14 are locked by the locking mechanism 75 at a specified position in the body case 11.

Although the embodiment described above involves disks 12, such as CDs or DVDs, as recordable media to be stored, the invention is not limited to CDs and DVDs. The invention is also applicable to disks to be stored in an exposed state such as MO and PD, cartridges such as DVD-RAM, and other media including, but not limited to, DAT and 8 mm tapes.

A storage device for recordable media is capable of moving the transfer mechanism to the retracted position by means of a drive unit and then pulling the storage portions out of the apparatus by means of the extension mechanism. Since the apparatus thus permits exchange of the magazines in their entirety, which respectively contain a large number of recordable media stored in the storage portions, it enables magazine-lot handling of a large number of recordable media at one time in a short period of time with minimal labor. In addition, since the operation can be conducted at the side of the body case where there may be the fewest obstacles, the apparatus is convenient to handle in that it does not impose conditions concerning the site of installation or of surrounding items which must be moved when magazines are removed or inserted.

While having the same effect as that of an apparatus as above, a storage device for recordable media is even more convenient in that its locking mechanism can lock the storage portions at a specified position in the body case and release the storage portions from the locked state whenever they are pulled out of the body case.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A recordable media storage device having a transfer mechanism for transferring a recordable media from a storage location to a media operation unit, said media operation unit is capable of at least one of reading from and recording to said recordable media, comprising:

a body case;

said body case having a front portion and a rear portion contained within said body case;

at least one storage portion in said rear portion of said body case;

said at least one storage portion includes at least one magazine;

each of said magazines being effective to store a plurality of recordable media therein;

said transfer mechanism is only located in said front portion when said body case is in a closed position;

said transfer mechanism including means for arbitrarily transferring one of said plurality of recordable media from and to said magazines of said at least one storage portions when said body case is in said closed position;

drive means, substantially located in said front portion when said body case is in said closed position, for moving said transfer mechanism to a desired transfer position corresponding to a target magazine and to a retracted position separated from said magazines; and an extension means for moving said at least one storage portion along said body case in a direction from said rear portion to said front portion, placing said body case in an extended position such that said at least one magazine is removable from said at least one storage portion only when said body case is in said extended position.

2. A recordable media storage device as claimed in claim 1, further comprising:

a locking mechanism;

said locking mechanism including means for locking said at least one storage portion in a locked state at a specified position in said body case and arbitrarily releasing said at least one storage portion from said locked state.

3. A recordable media storage device having a transfer mechanism for transferring a recordable media from a storage location to a media operation unit, said media operation unit is capable of at least one of reading from and recording to said recordable media comprising:

a body case having a front and rear portion;

at least one front storage portion in said front portion of said body case;

at least one rear storage portion in said rear portion of said body case;

each of said front storage portion and said rear storage portion including at least one magazine;

each of said magazines including means for storing a plurality of recordable media therein;

said transfer mechanism is only located between said front portion and said rear portion when said body case is in a closed position;

said transfer mechanism arbitrarily transferring one of said plurality of recordable media from and to said magazines of said storage portions when said body case is in a closed position;

a drive mechanism, substantially located between said front portion and said rear portion when said body case is in said closed position, including means for moving said transfer mechanism to a desired transfer position corresponding to a target magazine and to a retracted position separated from said magazines; and an extension mechanism for moving said storage portions along said body case in a direction from said rear portion to said front portion, placing said body case in an extended position such that said magazines are removable from said at least one storage portion when said body case is in said extended position.

4. A recordable media storage device as in claim 3, further comprising:

said extension mechanism is a pair of moveable slide rails; and said slide rails being moveable along said body case, to allow access to said rear portion of said body case, thereby permitting insertion, removal, or replacement of said media in said at least one rear storage portion in said rear portion of said body case.

5. A recordable media storage device as claimed in claim 3, further comprising:

a locking mechanism; and said locking mechanism including means for locking said storage portions in a locked state at a specified position in said body case and arbitrarily releasing said storage portions from said locked state.

6. A recordable media storage device as in claim 3, further comprising:

said extension mechanism is a pair of moveable slide rails;

said slide rails being moveable along said body case, to allow access to said rear portion of said body case, thereby permitting insertion, removal, or replacement of said media in said at least one rear storage portion in said rear of said body case;

a locking mechanism; and said locking mechanism including means for locking said storage portions in a locked state at a specified position in said body case and arbitrarily releasing said storage portions from said locked state.

7. A recordable media storage device having a transfer mechanism for transferring a recordable media from a storage location to a media operation unit, said media operation unit is capable of at least one of reading from and recording to said recordable media, comprising:

a body case having a front and rear portion;

at least one front storage portion in said front portion of said body case;

at least one rear storage portion in said rear portion of said body case;

each of said front storage portion and said rear storage portion including at least one magazine;

each of said magazines including means for storing a plurality of recordable media therein;

said transfer mechanism is only located between said front portion and said rear portion when said body case is in a closed position;

said transfer mechanism arbitrarily transferring one of said plurality of recordable media from and to said magazines of said storage portions when said body case is in said closed position;

a drive mechanism, substantially located between said front portion and said rear portion when said body case is in said closed position, including means for moving said transfer mechanism to a desired transfer position corresponding to a target magazine and to a retracted position separated from said magazines;

an extension mechanism for moving said storage portions along said body case;

said extension mechanism is a pair of moveable slide rails;

said slide rails being moveable along said body case in a direction from said rear portion to said front portion, placing said body case in an extended position to allow access to said rear portion of said body case when said body case is in said extended position, thereby permitting insertion, removal, or replacement of said media in said at least one rear storage portion in said rear of said body case;

a locking mechanism; and said locking mechanism including means for locking said storage portions in a locked state at a specified position in said body case and arbitrarily releasing said storage portions from said locked state.

* * * * *